O. H. OMODT.
PLANTER SUPPORT.
APPLICATION FILED AUG. 13, 1908.
930,880.
Patented Aug. 10, 1909.
2 SHEETS—SHEET 1.
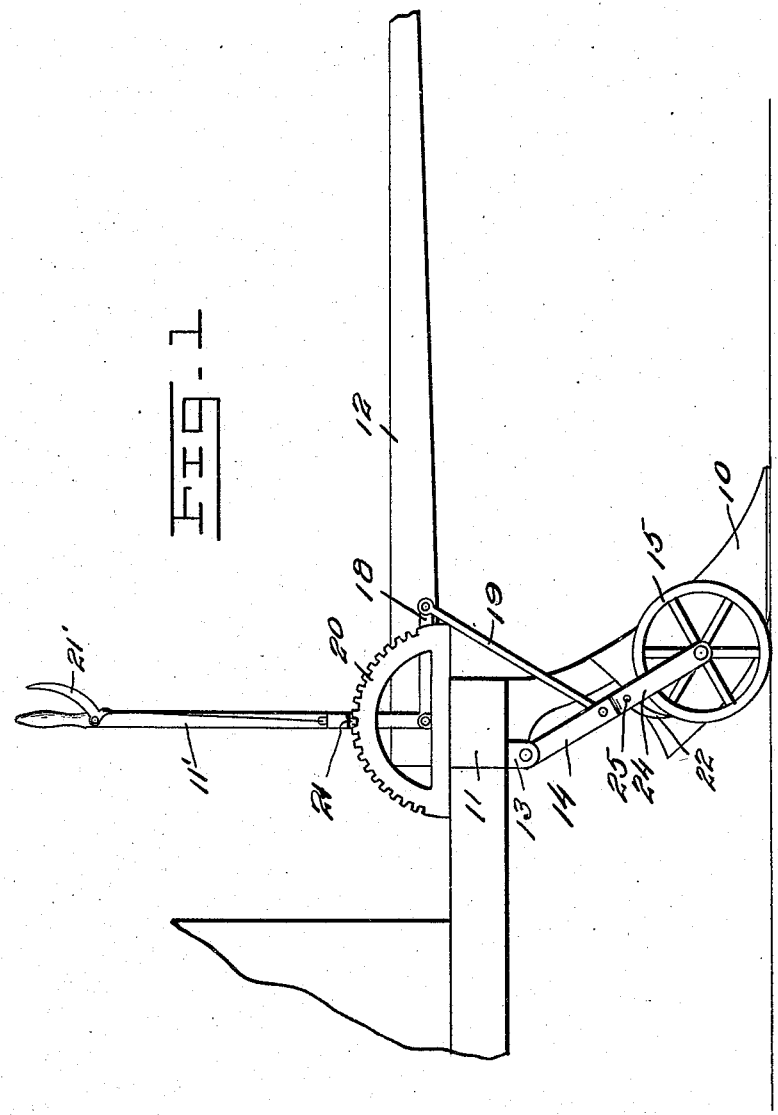
Witnesses
Inventor
O. H. Omodt,
By Woodward & Chandlee
Attorneys

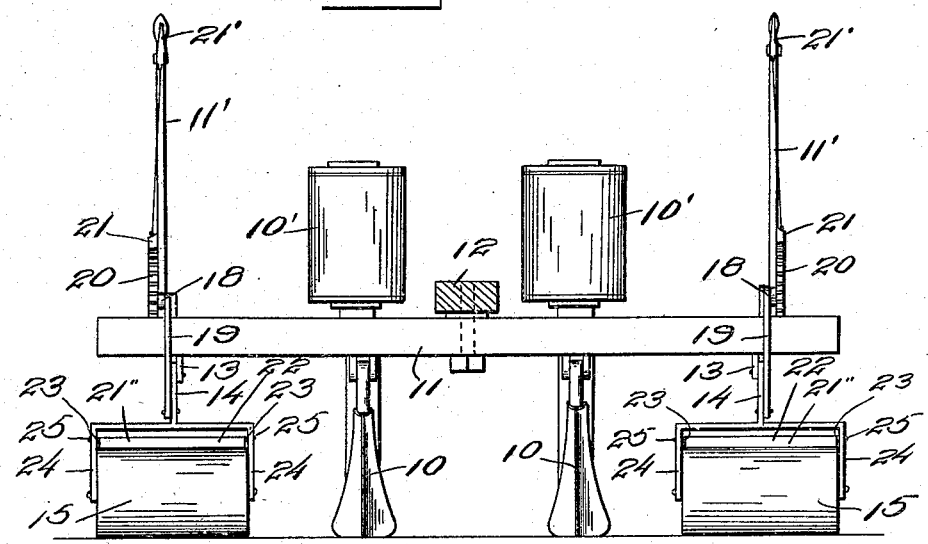
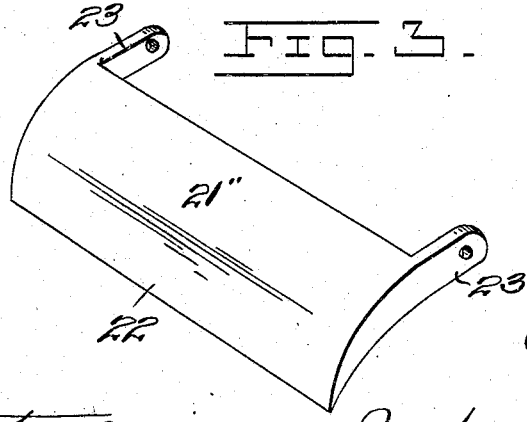

UNITED STATES PATENT OFFICE.

OSCAR H. OMODT, OF HOUSTON, MINNESOTA.

PLANTER-SUPPORT.

No. 930,880. Specification of Letters Patent. Patented Aug. 10, 1909.

Application filed August 13, 1908. Serial No. 448,357.

*To all whom it may concern:*

Be it known that I, OSCAR H. OMODT, a citizen of the United States, residing at Houston, in the county of Houston and State of Minnesota, have invented certain new and useful Improvements in Planter-Supports, of which the following is a specification.

This invention relates to agricultural machinery, and more particularly to planters, and has for its object to provide a support for corn planters and similar machines which will be adjustable to vary the depth of operation of the planter.

Another object is to provide such a device which is adaptable to vary the depth of planting between the opposite sides of a machine, to assure even planting on hillsides, where, when the row extends across the side of a hill, the lower side of the machine tends to plant deeper than the upper side.

Another object is to provide such a device of small size and simple structure, which may be manufactured at a low cost, and which will be adapted to use on the usual type of corn planters now in use.

Other objects and advantages will be apparent from the following description, and it will be understood that changes in the specific structure shown and described may be made within the scope of the claims and that any suitable materials may be used without departing from the spirit of the invention.

In the drawings forming a portion of this specification, and in which like numerals of reference indicate similar parts in the several views, Figure 1 is a side view of a corn planter equipped with the device, Fig. 2 is a front view of a similarly equipped planter showing but one side, Fig. 3 is a detail of the scraper.

Referring to the drawings, there is shown a planter frame having spaced plows 10 and hoppers 10' carried by a cross beam 11, the latter carrying a tongue 12. Castings or other suitable supports 13 are secured to the under face of the beam 11 at its rear edge adjacent each end, and pivoted in each casting there is a caster member 14 carrying revolubly therein a broad wheel or roller member 15, as shown. The caster member comprises simply a lever portion pivoted at its upper end between the supports 13 and having at its lower end a transverse head portion provided with downwardly extending arms 24 at its outer end in which the roller is pivotally journaled. This caster extends downwardly and forwardly below the beam 11 as shown, and is pivoted for movement longitudinally of the planter for vertical adjustment of the roller. Secured pivotally upon the upper side of the beam 11 there is a lever 11' which is provided with a lateral forward extension 18 at its lower end, from the outer end of which there depends a connecting rod 19 engaged with the caster member 14 at its lower end. A suitable rack bar 20 is positioned upon the beam 11 adjacent to the lever, and a pawl 21 is carried pivotally by the lever and engages with the teeth of the rack 20 to hold the lever at various points in its movement, being connected with a spring pressed operating handle 21' normally tending to hold the pawl in engagement with the ratchet and adapted for operation to remove the pawl from such engagement for adjustment of the lever. It will be seen that upon oscillation of the lever the caster member 14 will be operated to move the roller 15 upwardly or downwardly as desired, this causing the raising or lowering of the adjacent plows 10. It is desirable that the cross beam 11 should be attached pivotally to the tongue 12, as shown, in order that the opposite end of the beam may be adjusted at different heights when desired.

Pivoted to the upper portion of each caster member there is a scraper member 21" comprising a blade portion 22 having spaced laterally extending arms 23 perforated at their outer ends and engaged inwardly of the arms 24 of the caster member 14 by means of bolts or other suitable pivotal connections 25. The outer end of each scraper 22 is disposed at an acute angle against the face of a roller, and serves to keep it cleared of earth that may adhere thereto.

What is claimed is:

1. The combination with a planter frame including a cross beam and laterally spaced plow members, of caster members engaged pivotally with said cross beam, rollers carried by the caster members and means for oscillating said casters independently to vary the height of said rollers with respect to said planting members for the purpose described.

2. The combination with a planter having a cross beam and spaced planting members, of caster members pivoted beneath said cross beam, and carrying ground engaging rollers, levers pivoted above said beam, and having laterally extending arms, connecting rods between said arms and the lower portions of said caster members, rack bars disposed adjacent to said levers, and engaging means carried by said levers for engagement with said rack bar to hold said levers adjustably at various points in their movement.

In testimony whereof I affix my signature, in presence of two witnesses.

OSCAR H. OMODT.

Witnesses:
S. B. McIntire,
Clement Schonlan.